Patented Jan. 4, 1944

2,338,207

UNITED STATES PATENT OFFICE 2,338,207

EDIBLE OIL AND FAT

Sol Shappirio, Washington, D. C.

No Drawing. Application October 9, 1941, Serial No. 414,377. In Canada December 11, 1939

4 Claims. (Cl. 260—398.5)

This invention relates to edible oils and fats, and particularly to such products and compositions containing the same which include aging inhibitors particularly antioxidants, and methods of making the same.

A wide variety of antioxidants have been suggested in the prior art for utilization in the protection of substances, both glyceride containing and non-glyceride containing, both edible and non-edible, against aging deterioration largely concerned with oxidative change. Such anti-oxidants of the prior art may be generally looked upon as of three types, first, those of chemical character, such as the amines and phenols and derivatives thereof, acids, etc. Chemical antioxidants, however, are of limited utility since a great field of utilization for antioxidants lies in the realm of food products, or in connection with food products, and the utilization of chemical antioxidants, particularly when admixed into the food composition, is highly undesirable, and is barred by most food authorities. A second group of antioxidants are those derived from vegetive sources, while a third group includes those derived from animal sources. Such antioxidants from both the vegetative and animal sources are subject to criticism in that they are not directly subject to control in their production, but depend on life processes, which are relatively beyond the control of human agencies.

Among the objects of the present invention is the production of edible oils and fats containing extracts particularly of non-pathogenic bacteria to protect such oils and fats against oxidative deterioration.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, the metabolic products elaborated or produced by bacterial organisms are utilized as a source of antioxygenic activity. While various types of bacterial organisms may be utilized as the source of such antioxidant active substances, more particularly there is utilized principally in connection with food substances or other materials which come into contact with human or other animal beings, the non-pathogenic organisms, and more particularly such non-pathogenic organisms utilized are those of the acid-fast type. The utilization of such bacterial organisms as a source of antioxygenic properties offers a number of advantages. In the first place, the bacteria can be grown on synthetic or artificial media in relatively small quarters, so that no elaborate field or plant production is necessary, but substantial quantities of such antioxidants can be readily produced under very moderate facilities. More importantly, the antioxygenic substances obtained from such bacterial organisms are unique in character, and differ very markedly in a number of characteristics, both chemically and biologically and physically from antioxygenic substances derived from vegetative or animal sources. The differentiations chemically can be readily demonstrated in that the phosphatides, fats, waxes, proteins, and carbohydrates, and various cleavage products including fatty alcohols, pigments, alcohols, etc., obtained from such bacterial sources are quite different in character from those obtained from other living matter. And in fact, many of the substances obtainable in this way from bacterial sources are unique and are not obtainable and are not found in the products of other life processes. Thus it may be pointed out that the phosphatides and wax-like materials present in these products from bacterial organisms are complexes including carbohydrates or polysaccharides of unique and peculiar characteristics differing from those obtained from other life processes, with the result that such phosphatides and wax-like materials give unique reactions and characteristics, different from that produced from other living sources. These features will be more particularly explained below. Illustrating the use of non-pathogenic bacteria as a source of antioxygenic substances, reference may be made to various types of non-pathogenic organisms which may be utilized in this way, the non-pathogenic organisms being preferably used as against pathogenic organisms for reasons pointed out above. As illustrative of the non-pathogenic organisms, there may be mentioned lactic acid bacteria, the aceto-butylicum type of bacteria, and more particularly the acid-fast type of bacteria, particularly the timothy grass bacillus. In illustrating features of invention set forth herein particularly, the timothy grass bacillus will be utilized to illustrate the acid-fast non-pathogenic bacteria, but such use of timothy grass is not intended to be limiting except insofar as peculiar results are obtainable with the timothy grass bacillus and products derived therefrom; reference to the timothy grass, however, being made to illustrate generally the use of bacteria as a source of antioxygenic substances.

The bacterial products and derivatives utilized for antioxygenic purposes in accordance with the present invention may be applied in any desired way to the selected material in order to exhibit antioxygenic activity. Where the substances to be protected are in the form of readily disintegrable or powdered materials, the antioxygenic substance, if in solid condition, may be admixed intimately with such powdered or disintegrated substance to protect the latter. If the antioxygenic substance is in the form of a liquid, it may be intermixed with the solid material. If in the form of an extract in a volatile solvent, the volatile solvent may first be removed and the antioxygenic residue utilized for admixture with the substance to be protected, or the solvent extract may be intermixed with the substance to be protected, and the solvent then evaporated. If the substance to be protected against oxidative change in the form of a solid mass of material, then the antioxygenic substance may be applied as a coating over such solid mass. Thus a dust or powder of the antioxygenic substance may be applied over the solid mass, or a solution or solvent extract of the antioxygenic substance may be applied, and where a volatile solvent is employed, the latter evaporated. Where the substance to be protected is a liquid, the antioxygenic substance may be incorporated into the liquid, either as such, or in the form of a solution or in a volatile solvent, and the solvent subsequently evaporated. Or the substance to be protected if a liquid, may be subjected to direct incorporation with the bacterial material itself to produce an extract in situ in the liquid as, for example, when a glyceride oil is to be protected, the latter may be incorporated with bacterial substances in accordance with the present invention, and extracted directly into the glyceride produced, and the bacterial residues then either removed or permitted to remain. More desirably they are filtered off, so that a glyceride containing the extracted antioxygenic substances is directly obtained. Necessarily the method of utilization of the antioxygenic substance will depend on the characteristics of the substance to be protected, and the form of the antioxygenic substance, as just explained. The antioxygenic materials may be applied to packaging materials, such as paper, cardboard, waxed paper, Cellophane, oiled paper, etc., and utilized for application as a packaging material to a substance to be protected against oxidative deterioration.

The amounts of the antioxygenic substances utilized will depend in part on the antioxygenic content present therein, and the substance which is to be protected. It should be kept in mind, however, that only very small amounts of antioxygenic substances produced in accordance with the present invention need be utilized for direct incorporation or contacting with the substance to be protected. Thus the incorporation of ½% of antioxygenic substance, such as a phosphatide-containing material, into a glyceride oil is sufficient to give very substantial protection. Similarly in connection with other food products, either of glyceride-containing type or of non-glyceride-containing type, relatively small amounts and less than a fraction of 1% of the antioxygenic substance is sufficient to exhibit marked antioxidant activity.

Where dairy products or other aqueous emulsion-type materials are being protected, the antioxygenic substances may be utilized in the form of either water soluble or water dispersible substances, enabling them to be readily incorporated into the butter, milk, or similar types of substances and utilized for antioxygenic purposes, and here again only relatively small amounts, as for example, one-half of a percent of antioxygenic substance is sufficient.

Where wax-type materials or waxed paper, or wax-containing compositions, etc., are to be protected against oxidative deterioration, one may desirably utilize the wax-like substances obtained in accordance with the present invention from bacterial sources, and which exhibit antioxygenic activity. Such wax-like substances may be incorporated into the wax materials which are applied as coatings to the paper, or may be applied to the waxed paper after the latter has been incorporated. An advantage of the utilization of such wax-type materials as antioxygenic substances in accordance with waxed paper, etc., following the teachings of the present invention, resides in the fact that such inclusion of the wax-like antioxygenic substances of the present invention, does not substantially affect the waterproofing character of such waxed papers. Many prior art types of materials which have been suggested for use with the waxed papers actually result in an increase in porosity and moisture penetration of such wax-protected papers. The utilization of antioxidants of the present type avoid those difficulties.

Oil-soluble antioxygenic substances produced in accordance with the present invention may be utilized in connection with the glyceride types of materials, such as oils and fats, and particularly the edible oils and fats, such as those employed for shortening purposes, including cottonseed oil, peanut oil, etc. Various methods of applying the present invention will be illustrated below in connection with the utilization as an illustrative feature of antioxygenic substances derived from the acid-fast non-pathogenic timothy grass type bacillus.

Illustrating the invention by the utilization of the timothy grass bacillus, the latter may be incorporated with a glyceride oil, such as cottonseed oil, utilizing, for example, about 10% of the bacteria based on the weight of the oil, and warming the materials together at a moderate temperature, as for example, about 150° F. for about half an hour. Fat-soluble antioxygenic substances will be found to be transferred into the oil. The bacterial residues may be filtered off if desired, or may be permitted to remain with the oil. After such treatment, the oil will be found to exhibit marked antioxygenic properties, and to be materially protected against oxidative change.

Or the dried and ground bacillus, such as the timothy grass type referred to, may be intimately admixed with powdered milk, utilizing 1% of the former based on the weight of the latter. Material protection against aging deterioration is thus obtained.

The materials present in the bacterial sources which exhibit antioxygenic activity are believed to be tied up primarily with the lipid components. Phosphatides, fats, and wax-like substances are all present in such bacterial sources, and for the timothy grass type bacillus, it may be shown that there is present approximately 0.59% phosphatides, 2.75% fat, and 4.98% crude wax substances. In view of the fact that antioxygenic activity is tied up with such components, extracts of the bacterial substances can be utilized as the antioxygenic material, rather than the utilization of the bacterial substances per se. Water extracts yield very low contents of antioxygenic substances, and consequently it is preferred to utilize solvent extracts from the bacterial sources produced by the utilization of organic solvents, particularly volatile organic solvents, and there may be specifically mentioned such organic solvents as ether, alcohol, chloroform, etc., acid-containing extraction media being desirable in some instances as illustrated below in isolating desired substances. The following methods of utilizing organic solvents in producing antioxygenic extracts are exemplary.

The bacilli utilized are more desirably those which have attained maximum growth or pellicle formation, which with the timothy grass type bacillus takes about six to eight weeks of incubation. Any desirable synthetic medium may be utilized on which to grow such bacilla, a satisfactory medium for this purpose containing asparagin, ammonium citrate, potassium acid phosphate, sodium carbonate, sodium chloride, magnesium sulphate, ferric ammonium citrate, glycerol, and water in the proportions usually employed as media for the growth of bacteria. For the extraction of the bacterial lipids, the cultures after they have attained the maximum growth as indicated above, are desirably filtered, washed with water, and extracted with alcohol and ether, for example. For this purpose, the washed culture is immediately introduced into a mixture of equal parts of alcohol and ether, the latter having desirably having been saturated with carbon dioxide, and the extraction being carried out, desirably in an atmosphere of carbondioxide to avoid contamination. The extraction is exhaustibly carried out, as for example, at room temperature. The alcohol ether medium extracts most of the fat and phosphatide content of the bacterial substances with a small amount of wax, or rather wax-like substance. The extract may be concentrated under reduced pressure and at a low temperature. After the alcohol ether extraction referred to, the residues may be subjected to extraction with chloroform, which chloroform extract on concentration to dryness yields a crude wax-type material. The bacterial residues after the extractions referred to above are substantially free from lipids soluble in neutral solvents. However, they still contain a substantial amount of lipid materials firmly bound in the cellular structure. Such firmly bound lipids can be removed by treating the bacterial residues with a mixture of alcohol and ether containing a small amount such as 1% of hydrochloric acid, followed by extraction with ether or chloroform. These several extracts thus obtained will be further elaborated below in illustrating their character and utilization. The order of utilization of the solvent extracts referred to above is exemplary. The bacterial material may be subjected to direct contact with any of the stated extraction media directly, and only a single extraction produced, and such extracts employed in either concentrated or other condition as a source of antioxygenic activity. However, several fractions may be produced by successive utilization of solvent extraction as illustrated above.

These several fractions or any of the extracts produced may be utilized as such, either removing the extracting solvent after incorporation with the substance to be protected against oxidative deterioration or prior to such incorporation; or the extracts may be concentrated by removal of some or all of the solvent, and ultimately a substantially dry product produced free from solvents, in which substantially dry condition the material may be used in any manner as set forth above. The substances from any of the extracts are complex in character, and while they may be as indicated, depending on the particular type of solvent employed, largely phosphatide in character, or largely fat in character, or largely wax-like material, it is not intended to mean that no other substances are present in such complexes, since the separations produced by particular solvent extractions are not quantitative.

Thus the alcohol ether extract containing fats and phosphatide material may be added to a substance like a glyceride oil to be protected against oxidative deterioration incorporating a fraction of a percent such as .25% into the glyceride. Or the alcohol ether extract containing fats and phosphatides may be evaporated desirably under reduced pressure and at a low temperature to produce a concentrate, either partially or completely free of extracting solvent, and the antioxygenic residues employed in any manner set forth above, as for example, for incorporation into the glyceride oil. Similarly the wax-type materials extracted by chloroform from the residues after extraction with the alcohol ether combined solvent may be employed as an antioxygenic material desirably after removal of the chloroform extracting medium, and such material may desirably be employed particularly in connection with wax-type materials, such as paraffin or other wax-type substances used for coating papers, etc., where an antioxygenic substance is desirably present. For such purpose 1 to 10% of the wax-like material may be incorporated into the paraffin bath in which the paper is treated, or the wax coated paper, particularly with the wax in softened or liquid condition may be subjected to treatment with the antioxygenic substance and the wax then permitted to harden, so that the antioxygenic substance is carried in the wax coating on the paper.

Instead of using the extracts per se as obtained above, the extracts may be subjected to further treatment in order to segregate groups of materials therefrom. Thus the alcohol-ether extract produced as set forth above from the timothy grass bacillus, may be treated to separate the phosphatides from the fats. For this purpose the alcohol-ether extract may be treated with acetone to precipitate the phosphatide from fat and other ether-soluble constituents present, and the phosphatide obtained after removal of the acetone precipitant and other solvent components in the form of a substantially powdered material, which disperses readily in water forming colloidal solutions. Such materials as this phosphatide substance which is complex in character, may be utilized as an antioxygenic material in any of the manners set forth above, and particularly in view of its property of dispersing readily in water, it may be utilized in connection with aqueous materials, such as milk, butter, ice cream, etc., utilizing, for example, only a fraction of a percent, such as .25% to give substantial protection against oxidative deterioration. The use of such phosphatidinous substances is not, however, limited to water-containing substances, but may be used with the glyceride oils, etc., as set forth above.

After precipitation of the phosphatide substances by acetone, the residues containing fat and other ether-soluble constituents present in the solvent may be utilized as an anti-oxygenic substance analogous to the utilization of other such fractions as set forth above. Materials soluble in ice cold acetone may be obtained upon evaporation of the solvent, and are generally in the form of a soft fat-like mass. It is a complex mixture of substance that may be utilized as an antioxygenic material for incorporation with glycerides and other substances, and particularly lends itself to utilization as an antioxygenic material, being employed desirably only as a fraction of a percent based on the weight of the substance to be protected. Since it is a fat-type material, it may very desirably be employed in connection with glycerides, either liquid edible oils, for example, or shortening materials of solid or semi-solid consistency.

The crude wax-like material obtained above by chloroform extraction after the alcohol-ether extraction may be subjected to separation of ingredients, as for example, the material may be purified by precipitation from the ether solution by treatment with acetone or methyl alcohol, and a substantially amorphous powder obtained in this way. From the mother liquors a second fraction may also be obtained which is usually more complex and cruder in character than the precipitated powder referred to immediately above. The latter or second fraction is usually softer in character.

Some further comments may be given in connection with the type of antioxygenic materials which are thus separated by treatment of the several extracts. The chemical composition of the phosphatides, as obtained, for example, from the acid-fast bacteria differ very decidedly from that of phosphatides of plant or animal origin. This is shown in a number of respects, and particularly is emphasized by the fact that whereas the phosphatides from animal or plant origins exhibit substantial percentages of nitrogen in their constitution, the bacterial phosphatides contain very small amounts only of nitrogen, and in some cases scarcely more than a trace. In addition, on hydrolysis the bacterial phosphatides yield a substantial amount of carbohydrates which distinguishes them from the phosphatides obtained from plant or animal origins. The presence of the carbohydrate in combination in the phosphatide materials obtained from bacterial origin is particularly important in influencing the antioxygenic properties of these substances. The carbohydrates obtained are also different in character from those normally present in many animal and vegetable materials. The bacterial phosphatides may thus be distinguished from animal and vegetable phosphatides by (1) their low nitrogen (less than 1%) characteristic, (2) the presence of liquid saturated fatty acids of high molecular weight, (3) the special type of carbohydrate or polysaccharide present which on hydrolysis with dilute acids, for example, gives inosite, mannose and glucose.

The phosphatides as obtained herein may be utilized as such, or they may be subjected to further treatment. For example, they may be saponified with alcoholic potassium hydroxide to produce cleavage products, which are quite different from those obtained from the phosphatides of animal and vegetable origin. When saponified in this way, complexes are produced which include alcohol insoluble carbohydrate complexes that contain phosphorus. In other words, the fatty acids are split off from the phosphatide leaving the residual molecular substances, and these may also be utilized as a source of antioxygenic substance quite different from anything available from animal or plant origin. The important characteristic of the phosphatide showing great affinity for water inducing colloidal solutions has been referred to above, and is important in connection with a utilization in various types of substances, and particularly aqueous emulsions or water-containing materials as the antioxygenic substance.

The portion of the bacterial lipids soluble in ice cold acetone referred to above has been identified as acetone-soluble fat. It is generally of a soft, or semi-solid character, containing much of the pigmenting material, and may, therefore, be reddish in character, and having a characteristic odor. It is usually composed of a mixture of neutral fat and free fatty acids, the neutral fat differing markedly from ordinary fat in that the fat is not so much as glyceride as it is made up of complex esters of fatty acids with carbohydrates, such as a disaccharide, trehalose. These characteristics including the presence of liquid saturated fatty acids of high molecular weight, distinguish bacterial fats and lipids from any materials obtained from non-bacterial sources.

Some of the acids present, or which may be obtained by saponification from such fats, are unique in character, and differ materially from those available upon saponification of other acids. Some of the acids thus obtained are liquid in character and unsaturated. Lead salts or soaps of these acids can be produced, and their solubility in ether and hydrocarbon materials lend them particularly to use in connection with hydrocarbon motor fuels, lubricating oils, etc., as antioxidants.

The wax-like materials identified above which may be obtained, as for example, from the chloroform extraction are important quantitatively because they constitute the bulk of the ether-soluble constituents of the acid-fast bacteria, for example. They are not true waxes, since they are generally esters of higher hydroxy fatty acids with carbohydrates and with certain higher alcohols. The complex mixtures of materials exhibit antioxygenic activity and may be utilized as such in any of the manners set forth above. These wax-like substances include higher alcohols, which are peculiar to the bacterial substances and are not found elsewhere in nature. They appear to be specific metabolic products of the bacilli, and further characterize the unique substances produced herein and utilized for antioxygenic substances.

The firmly bound lipid type materials obtained as referred to above may be utilized as such as antioxygenic substances, or may be subjected to treatment to produce fractions therefrom. These firmly bound lipids are rather crude in character as first produced and represent a complex mixture of various substances. They are generally quite soluble in ether or chloroform. They may be purified for example by precipitation by addition of alcohol to the etherial solution to produce an amorphous powder melting with decomposition. These lipid fractions may be subjected to saponification to yield ether-soluble and water-soluble components, both of which are complex, the water-soluble components including polysaccharides, and either of which fractions, either the ether soluble or water-soluble components may be utilized as antioxygenic substances.

The unsaponifiable matter obtained after the bacterial fats have been saponified is usually in the form of a dark colored plastic mass. It is very complex in character, and may be utilized as such for antioxygenic purposes in any of the manners set forth above.

In accordance with the present invention, therefore, products of bacterial metabolism are utilized as a source of antioxygenic material, preferably utilizing extracts produced from the bacteria themselves for this purpose. As indicated, the organic solvent extracts are most desirable and may be utilized in small quantities to produce and exert markedly improved characteristics of antioxygenic character. The unique character of products obtained from bacterial sources stamp them as distinguished from the antioxygenic materials heretofore available in the art and derived from animal and vegetable or chemical sources. Furthermore, the fact that such materials can be produced under carefully controlled conditions where the bacteria are grown on artificial media enable them to be produced readily in any quantities desired within absolute control of the manipulator. Antioxygenic substances are obtainable in this way which are not capable of being produced in any other manner.

This application is a continuation-in-part of application Serial No. 267,335, filed April 11, 1939, entitled Compositions containing antioxidants.

Having thus set forth my invention, I claim:

1. The method which includes incorporating edible cottonseed oil with non-pathogenic bacteria, warming the mixture, and maintaining the said substances in contact until antioxygenic substances are transferred from the bacteria to the oil.

2. The method which includes incorporating edible cottonseed oil with non-pathogenic bacteria, warming the mixture, and maintaining the said substances in contact until antioxygenic substances are transferred from the bacteria to the oil and separating the bacterial residues from the treated oil.

3. The method which includes incorporating edible glyceride with non-pathogenic bacteria, warming the mixture, and maintaining the said substances in contact until antioxygenic substances are transferred from the bacteria to the glyceride.

4. The method which includes incorporating edible glyceride with non-pathogenic bacteria, warming the mixture, and maintaining the said substances in contact until antioxygenic substances are transferred from the bacteria to the glyceride and separating the bacterial residues from the treated glyceride.

SOL SHAPPIRIO.